United States Patent
Jahn et al.

(10) Patent No.: US 8,822,853 B2
(45) Date of Patent: Sep. 2, 2014

(54) ELECTRICAL SWITCH HAVING SIX SWITCH POSITIONS AND VEHICLE SEAT HAVING SAID SWITCH

(75) Inventors: Michael Jahn, Hoyerswerda (DE); Sandor Nitschmann, Ingolstadt (DE); Martin Speckner, Denkendorf (DE); Richard Wauschek, Manching (DE)

(73) Assignee: Continental Automotive GmbH, Hannover (DE)

( * ) Notice: Subject to any disclaimer, the term of this patent is extended or adjusted under 35 U.S.C. 154(b) by 470 days.

(21) Appl. No.: 13/202,308

(22) PCT Filed: Feb. 16, 2010

(86) PCT No.: PCT/EP2010/051923
§ 371 (c)(1),
(2), (4) Date: Aug. 18, 2011

(87) PCT Pub. No.: WO2010/094683
PCT Pub. Date: Aug. 26, 2010

(65) Prior Publication Data
US 2012/0073939 A1    Mar. 29, 2012

(30) Foreign Application Priority Data
Feb. 18, 2009  (DE) .......................... 10 2009 009 501

(51) Int. Cl.
*H01H 9/00*   (2006.01)

(52) U.S. Cl.
USPC ....................................................... 200/17 R

(58) Field of Classification Search
USPC ........ 200/17 R, 4, 512, 5 R, 5 A, 6 R, 6 A, 18, 200/329
See application file for complete search history.

(56) References Cited

U.S. PATENT DOCUMENTS

| | | | | |
|---|---|---|---|---|
| 2,941,048 A | | 6/1960 | Lybrook et al. | 200/6 A |
| 6,359,243 B1 | * | 3/2002 | Nakade et al. | 200/6 A |
| 6,421,046 B1 | | 7/2002 | Edgren | 345/168 |
| 6,897,391 B2 | | 5/2005 | Gavalda | 200/512 |
| 6,953,900 B2 | | 10/2005 | Sottong | 200/5 R |
| 6,974,920 B2 | * | 12/2005 | Yu | 200/6 A |
| 7,087,848 B1 | * | 8/2006 | Yamasaki et al. | 200/6 A |
| 7,317,976 B2 | | 1/2008 | Heimberger et al. | 701/36 |
| 7,595,712 B2 | * | 9/2009 | Nishino et al. | 335/207 |
| 2002/0023828 A1 | | 2/2002 | Chan et al. | 200/6 A |

(Continued)

FOREIGN PATENT DOCUMENTS

| | | | | |
|---|---|---|---|---|
| CN | 1339806 A | 3/2002 | | H01H 13/14 |
| CN | 1652273 A | 8/2005 | | G05G 9/047 |

(Continued)

OTHER PUBLICATIONS

German Office Ation, German Patent Application No. 10 2009 009 501.2-14, 2 pages, Sep. 7, 2009.

(Continued)

*Primary Examiner* — Edwin A. Leon
(74) *Attorney, Agent, or Firm* — King & Spalding L.L.P.

(57) ABSTRACT

An electrical switch, in particular a seat adjustment switch, has an activation element (7) and four signal receivers (6), wherein the switch has a total of six switch positions, wherein each of the switch positions is defined by the activation of a combination of two signal receivers.

20 Claims, 5 Drawing Sheets

(56) References Cited

U.S. PATENT DOCUMENTS

| | | | |
|---|---|---|---|
| 2004/0144628 A1 | 7/2004 | Sottong | 200/5 R |
| 2004/0173448 A1 | 9/2004 | Torrents | 200/517 |
| 2005/0190153 A1 | 9/2005 | Ushimaru et al. | 345/161 |

FOREIGN PATENT DOCUMENTS

| | | | | |
|---|---|---|---|---|
| DE | 3232126 | A1 | 3/1984 | B60N 2/02 |
| DE | 8516069 | U1 | 7/1985 | B60N 2/02 |
| DE | 19609390 | A1 | 9/1997 | B60K 37/06 |
| DE | 19645211 | A1 | 5/1998 | G05G 1/00 |
| DE | 19806479 | C1 | 7/1999 | B60N 2/02 |
| DE | 19882843 | T1 | 6/2001 | G06F 3/02 |
| DE | 19961874 | C1 | 7/2001 | B60N 2/02 |
| DE | 10124246 | C1 | 11/2002 | H01H 25/00 |
| DE | 10138463 | C1 | 3/2003 | B60R 16/02 |
| DE | 10227803 | A1 | 1/2004 | H01H 9/18 |
| DE | 10249757 | A1 | 5/2004 | B60R 16/02 |
| DE | 10302050 | A1 | 7/2004 | B60K 20/02 |
| DE | 102006001926 | A1 | 8/2007 | B60N 2/02 |
| DE | 102007004660 | A1 | 10/2007 | B60R 16/02 |
| DE | 102006060514 | A1 | 6/2008 | B60K 35/00 |
| DE | 102007005889 | A1 | 7/2008 | G06F 3/00 |
| EP | 1426991 | A1 | 6/2004 | G06G 9/02 |
| WO | 2010/094683 | A1 | 8/2010 | B60N 2/02 |

OTHER PUBLICATIONS

International Search Report and Written Opinion for Application No. PCT/EP2010/051923 (18 pages), May 31, 2010.
Chinese Office Action, Application No. 201080008287.2, 19 pages, Dec. 3, 2012.

* cited by examiner

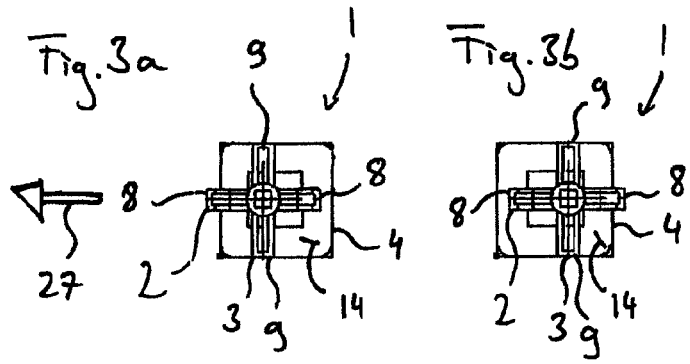
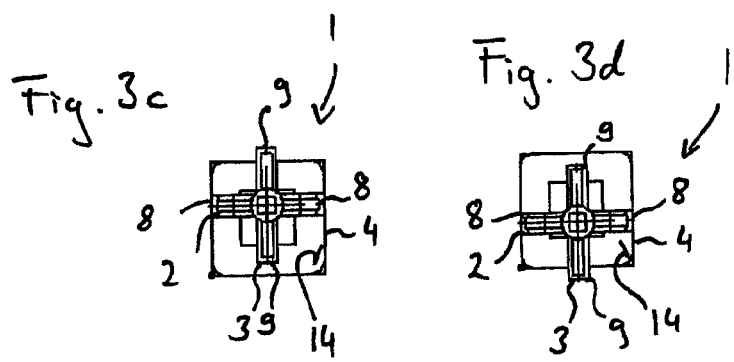
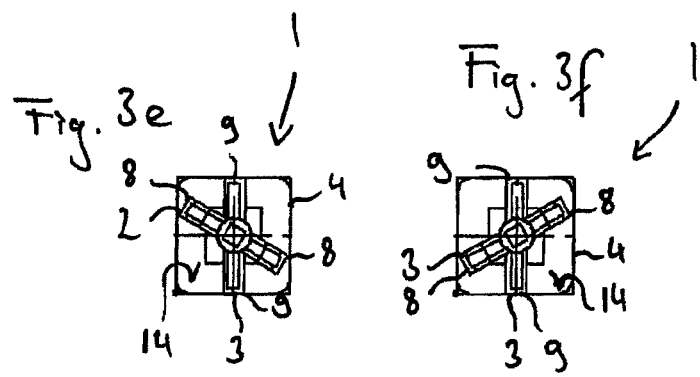

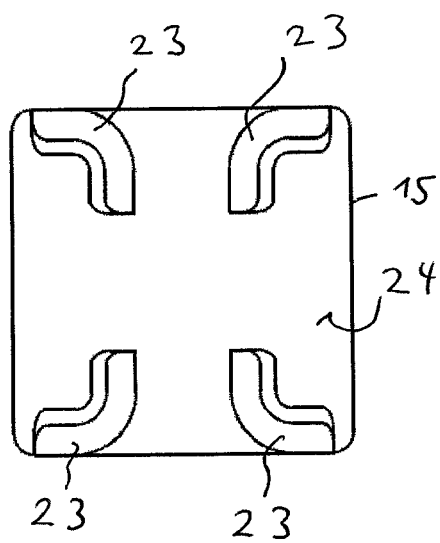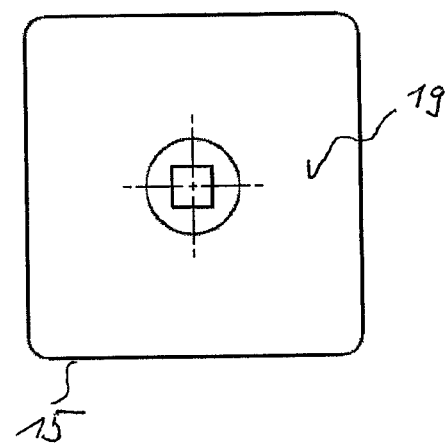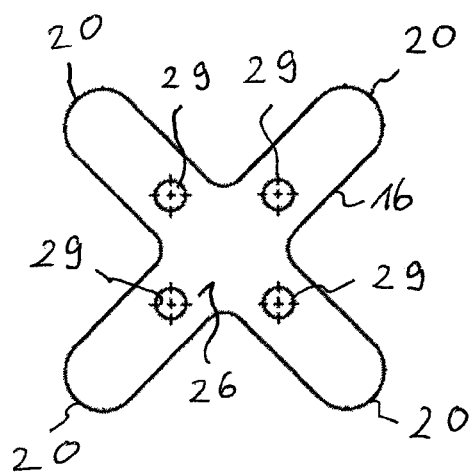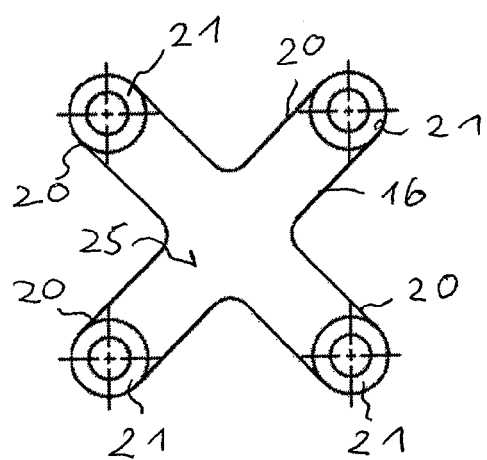

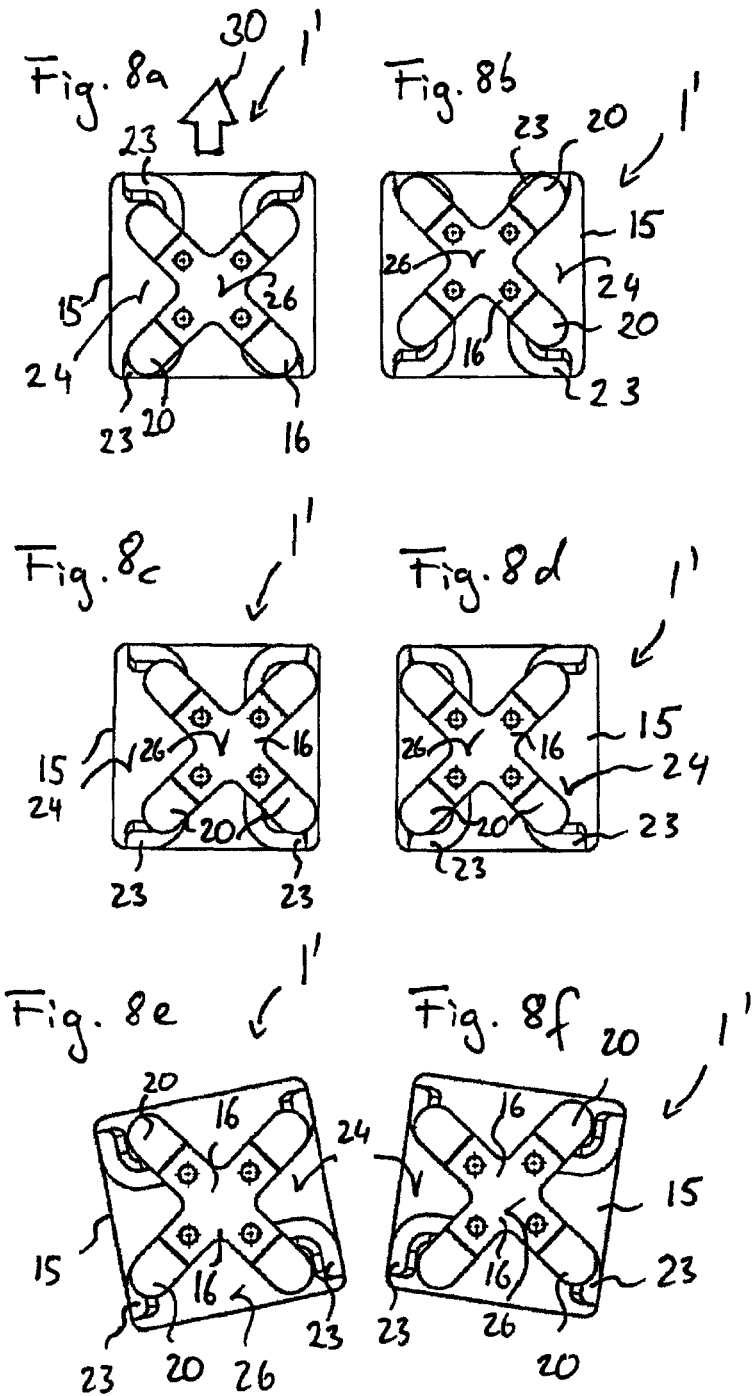

ELECTRICAL SWITCH HAVING SIX SWITCH POSITIONS AND VEHICLE SEAT HAVING SAID SWITCH

CROSS-REFERENCE TO RELATED APPLICATIONS

This application is a U.S. National Stage Application of International Application No. PCT/EP2010/051923 filed Feb. 16, 2010, which designates the United States of America, and claims priority to German Application No. 10 2009 009 501.2 filed Feb. 18, 2009, the contents of which are hereby incorporated by reference in their entirety.

TECHNICAL FIELD

The invention relates to a control unit for the electrical adjustment of a movable element of a motor vehicle, for example a vehicle seat. It also relates to a vehicle seat having such a control unit.

BACKGROUND

Movable elements in motor vehicles, such as, for example, seats, but also rear and side mirrors and the steering wheel, are often provided with electrical adjustment devices which allow optimum adaptation to the size and shape of the driver or passenger. In this case, the operator brings about the adaptations he desires by means of a pushbutton field or a series of adjustment buttons.

DE 851 60 69 U1 makes known a control unit for adjusting vehicle seats which can indeed be operated in an intuitive manner because the development of the control unit itself mimics the vehicle seat, but is designed in a relatively expensive manner and requires a lot of space.

DE 10 2006 001 926 A1 discloses a control unit for a vehicle seat which is to remedy this disadvantage by a large number of adjustment possibilities being realized by a small number of operating elements. To this end, the control unit has the possibility of switching back and forth between different menu levels.

A disadvantage of this, however, is the less intuitive method of operation which initially has to be learnt.

SUMMARY

According to various embodiments, a control unit for the electrical adjustment of a movable element of a motor vehicle can be provided, said control unit being at the same time simple to operate, simple in design and requiring a small installation space.

According to various embodiments, a control unit for the electrical adjustment of a movable element of a motor vehicle can be provided, wherein the movable element has three degrees of freedom of movement; the control unit has four signal receivers and a total of six switch positions, and wherein each of the switch positions is defined by the actuation of a combination of two signal receivers.

According to a further embodiment, the four signal receivers can be arranged substantially in one plane at the four corners of a square, wherein the signal receiver arranged clockwise after the first signal receiver is designated as the second signal receiver, the signal receiver arranged clockwise after the second signal receiver is designated as the third signal receiver and the signal receiver arranged clockwise after the third signal receiver is designated as the fourth signal receiver. According to a further embodiment, the first switch position of the control unit can be defined by the simultaneous actuation of the first and the second signal receiver, the second switch position can be defined by the simultaneous actuation of the second and the third signal receiver, the third switch position can be defined by the simultaneous actuation of the third and the fourth signal receiver, the fourth switch position can be defined by the simultaneous actuation of the fourth and the first signal receiver, the fifth switch position can be defined by the simultaneous actuation of the first and the third signal receiver and the sixth switch position can be defined by the simultaneous actuation of the second and the fourth signal receiver. According to a further embodiment, the control unit may also have an actuating element for actuating in each case two signal receivers. According to a further embodiment, the actuating element can be realized as an adjustment button with four continuations, wherein the adjustment button has six switch positions which correspond to the six switch positions of the control unit. According to a further embodiment, through translation and/or rotation the adjustment button can be transferable from one switch position into another switch position. According to a further embodiment, the three degrees of freedom of movement of the movable element may represent three degrees of freedom of translation. According to a further embodiment, the three degrees of freedom of movement of the movable element can be arranged into two degrees of freedom of translation and one degree of freedom of rotation. According to a further embodiment, the signal receivers can be realized as pushbutton switches. According to a further embodiment, the movable element can be realized as a seat for a passenger. According to a further embodiment, the three degrees of freedom of movement may represent the movement of the seat up or down, to the right or to the left and to the front or the rear. According to a further embodiment, the three degrees of freedom of movement may represent the movement of the seat up or down, to the front or the rear and the rotation of the back rest.

According to other embodiments, a motor vehicle seat can be provided with at least one control unit as described above.

BRIEF DESCRIPTION OF THE DRAWINGS

Exemplary embodiments are explained below by way of the attached figures, in which, in detail:

FIGS. 3a-3f shows a schematic representation of the control unit in FIG. 1 in its six different switch positions;

FIGS. 6a-6b shows a schematic representation of views of a switch plate of the control unit in FIG. 4;

FIGS. 7a-7b shows a schematic representation of views of a pushbutton unit of the control unit in FIG. 4 and FIGS. 8a-8f shows a schematic representation of the control unit in FIG. 4 in its six different switch positions.

Identical parts are provided with the identical references in all the figures and are not additionally explained.

DETAILED DESCRIPTION

Figure 1:
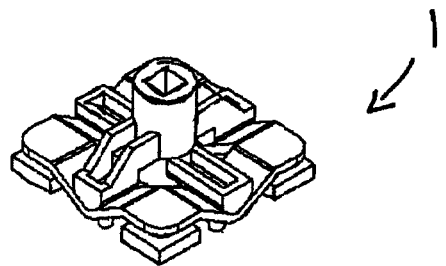
FIG. 1 shows a schematic representation of a control unit according to a first embodiment.

A control unit for the electrical adjustment of a movable element of a motor vehicle is provided according to various embodiments, wherein the element has three degrees of freedom of movement and the control unit has four signal receivers and, apart from an idle position or neutral position, a total of six switch positions. Each of the switch positions is defined by the actuation of a combination of two signal receivers.

According to various embodiments, six switch positions are to be realized for actuating a moveable element, for example a vehicle seat, with three degrees of freedom. For example, in the case of a possible movement in the x, y and z direction, it must be possible to give instructions for movements in the x, −x, y, −y, z and −z direction. To this end, solutions with, for example, six pushbutton switches or three selective switches are known in the prior art. However, expenditure on material for the control unit can be reduced through the knowledge that the use of only four pushbutton switches is also sufficient to realize six different switch positions, when namely each switch position is defined not by the actuation of one of the push-button switches, but by the actuation of a combination of two pushbutton switches. For six different double combinations of this type can be obtained from four pushbutton switches. These considerations are applicable not only when pushbutton switches are used as signal receivers, but also for the use of other signal receivers which, in each case, have an actuated and a non-actuated state.

In one embodiment the four signal receivers are arranged substantially in one plane at the four corners of a square, the signal receiver arranged clockwise after the first signal receiver being designated as the second signal receiver, the signal receiver arranged clockwise after the second signal receiver being designated as the third signal receiver and the signal receiver arranged clockwise after the third signal receiver being designated as the fourth signal receiver.

In one embodiment, in this case, the first switch position of the control unit is defined by the simultaneous actuation of the first and the second signal receiver. The second switch position is defined by the simultaneous actuation of the second and the third signal receiver. The third switch position is defined by the simultaneous actuation of the third and the fourth signal receiver. The fourth switch position is defined by the simultaneous actuation of the fourth and the first signal receiver. The fifth switch position is defined by the simultaneous actuation of the first and the third signal receiver. The sixth switch position is defined by the simultaneous actuation of the second and the fourth signal receiver.

In one embodiment, the control unit also comprises an actuating element for actuating in each case two signal receivers, said actuating element being realized, for example, as an adjustment button with four actuating arms or continuations, the adjustment button having six switch positions which correspond to the six switch positions of the control unit. In other words: in each of the six switch positions, in each case two actuating arms actuate another combination of two signal receivers.

In this case, the actuating arms or continuations must not be rigidly connected to each other. Embodiments are conceivable, for example, where the actuating arms are arranged in a cross shape, however the cross not being realized in one piece but having two "crosspieces" which are crossed with each other and can be moved in part independently of each other.

In one embodiment, the adjustment button is transferable from one switch position into another switch position through translation and/or rotation. For example, two translations and one rotation can be provided as adjustment possibilities.

In one embodiment, the three degrees of freedom of movement of the movable element represent three degrees of freedom of translation. In an alternative embodiment, the three degrees of freedom of movement of the movable element are arranged into two degrees of freedom of translation and one degree of freedom of rotation.

The latter is, for example, typically the case with a vehicle seat which is to be adjusted in its height above the floor of the driver's cab, in its distance from the steering wheel or instrument panel and additionally in the tilting of its back rest. The three degrees of freedom of movement then represent the movement of the seat up or down, to the front or the rear and the rotation of the back rest.

As an alternative to this, however, the three degrees of freedom of movement can also represent the movement of the seat or of another element, such as, for example, a mirror or an individual element on a seat, up or down, to the right or the left and to the front or the rear.

The control unit according to various embodiments is consequently suited to be used with a vehicle seat.

It has the advantage that the full range of functions can be achieved with a reduced number of parts and consequently with a particularly small amount of time and money spent on technical matters. The control unit according to various embodiments unites all the switch possibilities in one single unit and is consequently able to be produced in a particularly cost-efficient manner, is light and requires little installation space. In addition, it has fewer wear parts than conventional control units and consequently gives rise to less expenditure on maintenance. In addition, it is very intuitively controllable and the geometry thereof can easily be adapted to new defaults, for example to meet specific demands in terms of haptics.

FIG. 1 shows a schematic representation of a control unit 1 according to a first embodiment.

The control unit 1, in this embodiment, is provided for the electrical adjustment of a vehicle seat and is incorporated into the driver's cab. It can have a handle (not shown), by means of which the driver or another passenger can access the control unit 1.

In this embodiment, the control unit 1 serves for the adjusting of the seat in its height and in its distance from the steering wheel or instrument panel and for the adjustment of the tilting of the back rest.

Figure 2:
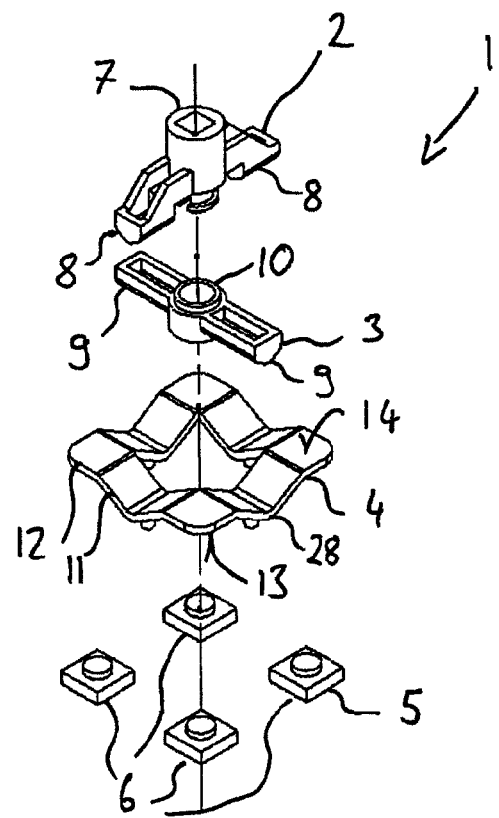
FIG. 2 shows a schematic representation of an exploded view of the control unit in FIG. 1.

FIG. 2 shows a schematic representation of an exploded view of the control unit 1 in FIG. 1, in which the individual components of the control unit 1 can be seen.

The control unit 1, in this embodiment, has arranged one above the other a shifting claw 2, a flexibly mounted crosspiece 3, a ramp plate 4 realized in a flexible manner per se and a pushbutton field 5.

The shifting claw 2 is divided into an adjustment button 7, on which, for example, a handle (not shown) for the operator can be mounted, and two opposite continuations 8.

The crosspiece 3 has a central bearing arrangement 10, at which it is connected to the adjustment button 7 of the shifting claw 2, and also two opposite continuations 9, which, in an idle position or neutral position of the control unit 1, form a right-angled cross with the continuations 8 of the shifting claw 2.

The ramp plate 4 has four plateaus 12, which are arranged at the corners of a square and are connected together by way of ramps 11 by sections.

The pushbutton field 5 comprises four pushbutton switches 6 which are arranged at the corners of a square and, in an idle position or neutral position of the control unit 1, lie under the four plateaus 12 facing the bottom side 13 of the ramp plate 4.

Consequently, FIG. 1 shows the idle position or neutral position of the control unit 1, which is characterized by the actuation of none of the pushbutton switches 6 and into which the control unit 1 also returns after actuation by an operator.

FIG. 3 shows a schematic representation of the control unit 1 in FIG. 1 in its six different switch positions. Here, FIG. 3a shows a switch position in which an adjustment of the seat to the front is brought about, FIG. 3b shows a switch position for an adjustment to the rear, FIG. 3c shows a switch position for an adjustment up and FIG. 3d shows a switch position for an adjustment down. FIG. 3e shows a switch position for a tilting of the back rest of the seat to the front and FIG. 3f shows a switch position for a tilting of the back rest to the rear.

The method of operation of the control unit 1 is explained below by way of the example of FIG. 3a:

In order to move the seat further to the front, the operator moves the shifting claw 2 out of its idle position or neutral position in the direction of the arrow 27. The shifting claw 2, in this case, also brings about a movement of the crosspiece 3, in which it engages, in the direction of the arrow 27. The crosspiece 3, in this case, slides on the upper side 14 of the ramp plate 4 from the deepest point 28 of the ramp plate 4, in which it rests in the idle position or neutral position of the control unit 1, along one of the ramps 11 and consequently exerts pressure onto said ramp 11 which brings about a tipping or deforming of the somewhat flexibly realized ramp plate 4. This actuates two of the four pushbutton switches 6, in the example shown in FIG. 3a the two pushbutton switches 6 shown at the top on the left and at the bottom on the left.

For an adjustment of the tilting of the back rest of the seat, the operator rotates the shifting claw 2 about its axis of symmetry. In this case, however, only the shifting claw 2 is rotated whilst the crosspiece 3 remains in its idle position such that, depending on the direction of rotation, in each case two pushbutton switches 6 that are diagonally opposite each other are actuated.

In each of the six switch positions of the control unit 1 shown in FIG. 3, a different combination of two of the four pushbutton switches 6 is actuated. Consequently, one actuated pushbutton switch combination can clearly be assigned to one of the six switch positions which are evaluated by an electronic unit (not shown) connected downstream.

The pushbutton switches 6 and the ramp plate 4, in the embodiment shown, are fixed on a printed circuit board (not shown), the ramp plate 4 being fixed in such a manner that it can compensate for mechanical tolerances. It ensures that the pushbutton switches 6 are only actuated in an axial manner, that is to say in a direction perpendicular to the printed circuit board on which it is fixed. This ensures that the load on the pushbutton switches 6 is optimum and consequently that there is less wear.

Figure 4:
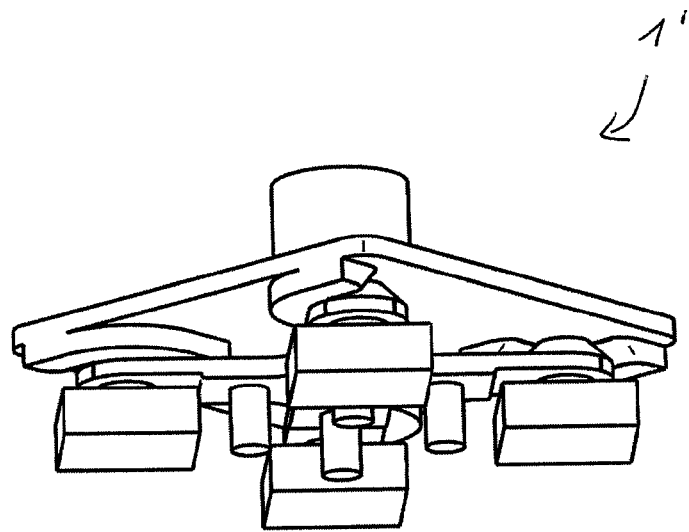
FIG. 4 shows a schematic representation of a control unit in a second embodiment.

FIG. 4 shows a schematic representation of a control unit 1' according to a second embodiment. The control unit 1', in this embodiment also, is provided for the electrical adjustment of a vehicle seat and is incorporated into the driver's cab.

Figure 5:
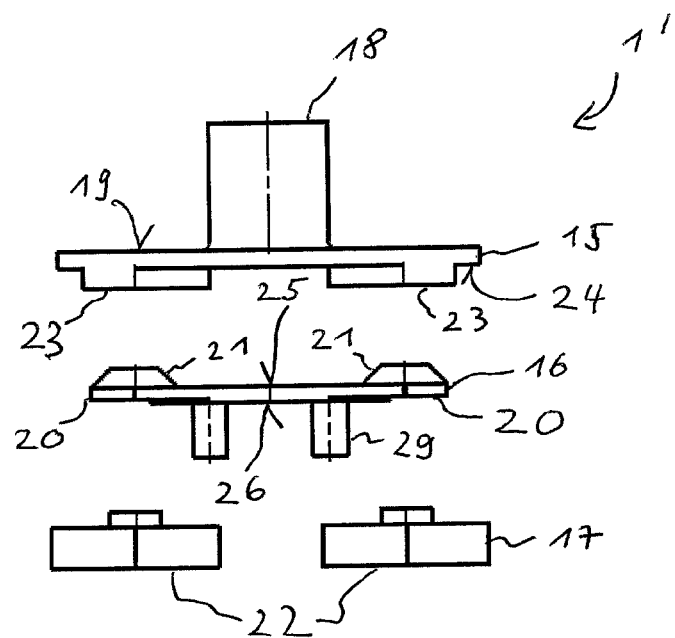
FIG. 5 shows a schematic representation of an exploded view of the control unit in FIG. 4.

As can be seen in the exploded representation in FIG. 5, the control unit 1' is divided into a substantially square switch plate 15, a pushbutton unit 16 and a pushbutton field 17.

In this case, the switch plate 15 has an adjustment button 18 on its upper side 19, it being possible, for example, for a handle (not shown) for the operator to be mounted on said adjustment button, and on its bottom side 24 at each of its corners connection bows 23, which are realized as thickenings of the switch plate 15.

The pushbutton unit 16, which faces the bottom side 24 of the switch plate 15 by way of its upper side 25, is realized flexibly per se and has four continuations 20, which are arranged in such a manner in relation to each other that they form a perpendicular cross. A beveled elevation 21 is arranged on each of the four continuations on the upper side 25 of the pushbutton unit 16. On the bottom side 26 of the pushbutton unit 16 is arranged a number of pins 29, by means of which the pushbutton unit 16 is supported on a printed circuit board (not shown).

The pushbutton field 17 of the control unit 1' comprises four pushbutton switches 22, which are arranged at the corners of a square and, in an idle position or neutral position of the control unit 1', rest under the four beveled elevations 21 facing the bottom side 26 of the pushbutton unit 16. In this case, the idle position or neutral position of the control unit 1' is realized corresponding to that of the control unit 1 according to the first embodiment. This position is automatically assumed again after a switch operation in the case of the second embodiment also.

FIG. 6a shows a view from below onto the switch plate 15 of the control unit 1'. The connection bows 23, which are arranged at the corners on the bottom side 24 of the switch plate 15, can be seen particularly well in this view. On the inside of the bow, the connection bows 23 each have bevelings which interact with the bevelings of the elevations 21 on the pushbutton unit 16.

FIG. 6b shows a view from above onto the switch plate 15 of the control unit 1', it being possible to see that the adjustment button 18 is arranged centrally on the upper side 19 of the switch plate 15.

FIG. 7a shows a view from below onto the pushbutton unit 16 of the control unit 1'.

FIG. 7b shows a view from above onto the pushbutton unit 16 of the control unit 1', with the beveled elevations 21 at the ends of the four continuations 20.

FIG. 8 shows a schematic representation of the control unit 1' in FIG. 4 in its six different switch positions, a view from below and the pushbutton field 17 being left out for reasons of clarity. In this case, FIG. 8a shows a switch position in which the seat is adjusted up, FIG. 8b shows a switch position for an adjustment down, FIG. 8c shows a switch position for an adjustment to the front and FIG. 8d shows a switch position for an adjustment to the rear. FIG. 8e shows a switch position for a tilting of the back rest of the seat to the front and FIG. 8f shows a switch position for a tilting of the back rest to the rear.

The method of operation of the control unit 1 is explained below by way of the example of FIG. 8a:

In order to move the seat further up, the operator moves the switch plate 15 out of its idle position or neutral position in the direction of the arrow 30 by means of a handle (not shown) fastened on the adjustment button 18 and consequently effects a relative displacement of switch plate 15 and pushbutton unit 16 in relation to each other. The connection bows 23, serving as a type of gear shifting gate, at the two bottom corners of the switch plate 15 in FIG. 8a, thus move into contact with the beveled elevations 21 of the two bottom continuations 20 of the pushbutton unit 16 in FIG. 8a and are pushed over them.

In the embodiment shown, the connection bows 23 are in each case also beveled at an angle of approximately 45 degrees at least on their inner sides, as are also the elevations 21. This ensures that connection bows 23 and elevations 21 interact in an optimum manner and convert a horizontal movement of a connection bow 23 and of an elevation 21 one to one into a vertical movement of the elevation 21.

As already mentioned above, the two lower connection bows 23 are pushed over the two lower elevations 21 during the switching process in FIG. 8a. This means that the extensively rigid switch plate 15 presses the flexible pushbutton unit 16 down in the region of the two lower elevations 21 such that the two pushbutton switches 22 of the pushbutton field 17 arranged underneath are actuated. This combination of two actuated pushbutton switches 22 is evaluated by an electronic unit connected downstream (not shown) and is assigned to a corresponding operator instruction, namely to adjust the seat up.

As in the case of the first embodiment, other combinations of two adjacent pushbutton switches 22 are actuated by displacing the switch plate 15 into the directions shown in FIGS. 8*b*, 8*c* and 8*d*, as a result of which an adjustment of the seat down, to the front or to the rear is effected.

For an adjustment of the tilting of the back rest of the seat, the operator rotates the switch plate 15 about its axis of symmetry, as shown in FIGS. 8*e* and 8*f*. In this way, depending on the direction of rotation, in each case two elevations 21 of the flexible pushbutton unit 16 located diagonally opposite each other are pressed down, as a result of which they actuate the corresponding pushbutton switches 22 located diagonally opposite each other.

In each of the six switch positions of the control unit 1' shown in FIG. 8, another combination of two of the four pushbutton switches 22 is actuated. Consequently, it is possible to assign one actuated pushbutton switch combination clearly to one of the six switch positions, which are evaluated by an electronic unit connected downstream (not shown).

An advantage of this second embodiment of the control unit 1' is that it is designed mechanically in a particularly simple manner and is built up from few elements such that it can be provided in a cost-efficient manner on account of its small material requirement and additionally is very light.

LIST OF REFERENCES

1, 1' Control unit
2 Shifting claw
3 Crosspiece
4 Ramp plate
5 Pushbutton field
6 Pushbutton switch
7 Adjustment button
8 Continuation
9 Continuation
10 Central bearing arrangement
11 Switch ramp
12 Plateau
13 Bottom side of the ramp plate
14 Upper side of the ramp plate
15 Switch plate
16 Pushbutton unit
17 Pushbutton field
18 Adjustment button
19 Upper side of the switch plate
20 Continuation
21 Inclined elevation
22 Pushbutton switch
23 Connection bow
24 Bottom side of the switch plate
25 Upper side of the pushbutton unit
26 Bottom side of the pushbutton unit
27 Arrow
28 Deepest point
29 Pins
30 Arrow

The invention claimed is:

1. A control unit for the electrical adjustment of a movable element of a motor vehicle, wherein:
the movable element has three degrees of freedom of movement;
the control unit comprises four independently-actuatable signal receivers and defines six different switch positions,
wherein each of the six different switch positions is defined by the actuation of a unique combination of two of the four independently-actuatable signal receivers, and
wherein at least one of the independently-actuatable signal receivers is actuated in at least two different switch positions.

2. The control unit according to claim 1, wherein the four signal receivers are arranged substantially in one plane at the four corners of a square, wherein the signal receiver arranged clockwise after the first signal receiver is designated as the second signal receiver, the signal receiver arranged clockwise after the second signal receiver is designated as the third signal receiver and the signal receiver arranged clockwise after the third signal receiver is designated as the fourth signal receiver.

3. The control unit according to claim 2, wherein
the first switch position of the control unit is defined by the simultaneous actuation of the first and the second signal receiver,
the second switch position is defined by the simultaneous actuation of the second and the third signal receiver,
the third switch position is defined by the simultaneous actuation of the third and the fourth signal receiver,
the fourth switch position is defined by the simultaneous actuation of the fourth and the first signal receiver,
the fifth switch position is defined by the simultaneous actuation of the first and the third signal receiver and
the sixth switch position is defined by the simultaneous actuation of the second and the fourth signal receiver.

4. The control unit according to claim 1, wherein the control unit also has art actuating element for actuating in each case two signal receivers.

5. The control unit according to claim 4, wherein the actuating element is realized as an adjustment button with four continuations, wherein the adjustment button has six switch positions which correspond to the six switch positions of the control unit.

6. The control unit according to claim 5, wherein through at least one of translation and rotation the adjustment button is transferable from one switch position into another switch position.

7. The control unit according to claim 1, wherein the three degrees of freedom of movement of the movable element represent three degrees of freedom of translation.

8. The control unit according to claim 1, wherein the three degrees of freedom of movement of the movable element are arranged into two degrees of freedom of translation and one degree of freedom of rotation.

9. The control unit according to claim 1, wherein the signal receivers are realized as pushbutton switches.

10. The control unit according to claim 1,
wherein the movable element is realized as a seat for a passenger.

11. The control unit according to claim 10, wherein the three degrees of freedom of movement represent the movement of the seat up or down, to the right or to the left and to the front or the rear.

12. The control unit according to claim 10, wherein the three degrees of freedom of movement represent the movement of the seat up or down, to the front or the rear and the rotation of the back rest.

13. A motor vehicle seat with at least one control unit for the electrical adjustment of the motor vehicle seat, wherein:

the vehicle seat has three degrees of freedom of movement;

the at least one control unit comprises four independently-actuatable signal receivers and defines six different switch positions, and wherein each of the six different switch positions is defined by the actuation of a unique combination of two of the four independently-actuatable signal receivers, and wherein at least one of the in dependently-actuatable signal receivers is actuated in at least two different switch positions.

14. The motor vehicle seat according to claim 13, wherein the four signal receivers are arranged substantially in one plane at the four corners of a square, wherein the signal receiver arranged clockwise after the first signal receiver is designated as the second signal receiver, the signal receiver arranged clockwise after the second signal receiver is designated as the third signal receiver and the signal receiver arranged clockwise after the third signal receiver is designated as the fourth signal receiver.

15. The motor vehicle seat according to claim 14, wherein the first switch position of the control unit is defined by the simultaneous actuation of the first and the second signal receiver, the second switch position is defined by the simultaneous actuation of the second and the third signal receiver, the third switch position is defined by the simultaneous actuation of the third and the fourth signal receiver, the fourth switch position is defined by the simultaneous actuation of the fourth and the first signal receiver, the fifth switch position is defined by the simultaneous actuation of the first and the third signal receiver and the sixth switch position is defined by the simultaneous actuation of the second and the fourth signal receiver.

16. The motor vehicle seat according to claim 13, wherein the control unit also has an actuating element for actuating in each case two signal receivers.

17. The motor vehicle seat according to claim 16, wherein the actuating element is realized as an adjustment button with four continuations, wherein the adjustment button has six switch positions which correspond to the six switch positions of the control unit.

18. The motor vehicle seat according to claim 17, wherein through at least one of translation and rotation the adjustment button is transferable from one switch position into another switch position.

19. The motor vehicle seat according to claim 13, wherein the three degrees of freedom of movement of the vehicle seat represent three degrees of freedom of translation.

20. The motor vehicle seat according to claim 13, wherein the three degrees of freedom of movement of the vehicle seat are arranged into two degrees of freedom of translation and one degree of freedom of rotation.

* * * * *